Figure 1:
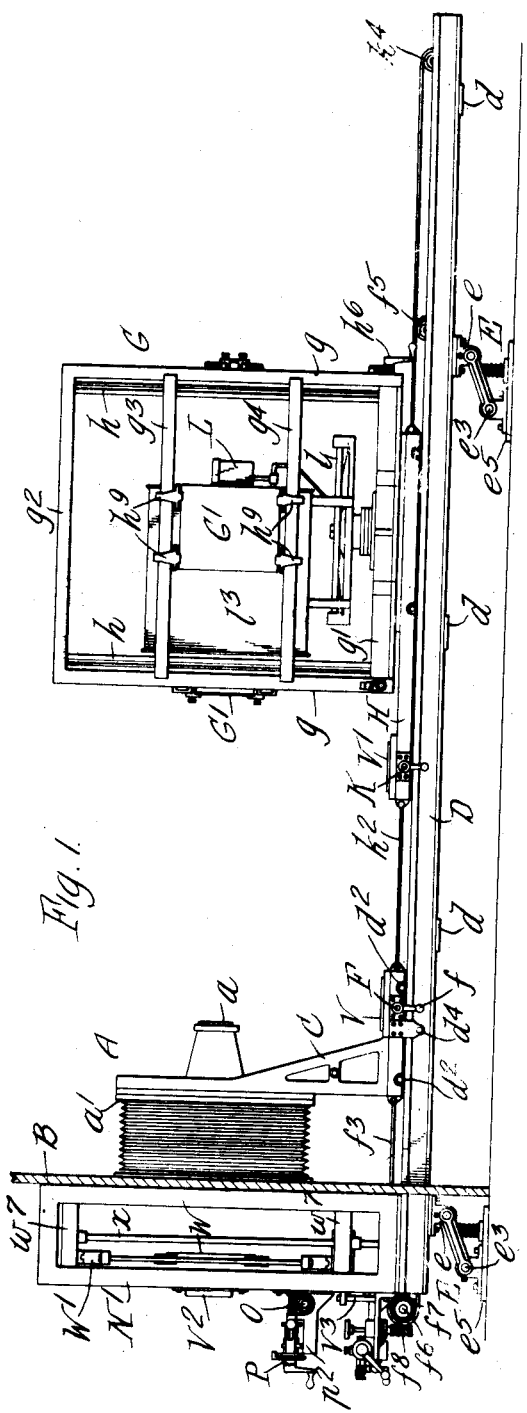

W. C. HUEBNER.
PHOTOGRAPHIC APPARATUS.
APPLICATION FILED OCT. 9, 1914.

1,195,225.

Patented Aug. 22, 1916.
11 SHEETS—SHEET 1.

Witnesses:

Inventor:
Wm. C. Huebner
By Wilhelm & Parker
Attorneys.

W. C. HUEBNER.
PHOTOGRAPHIC APPARATUS.
APPLICATION FILED OCT. 9, 1914.
1,195,225.
Patented Aug. 22, 1916.
11 SHEETS—SHEET 2.
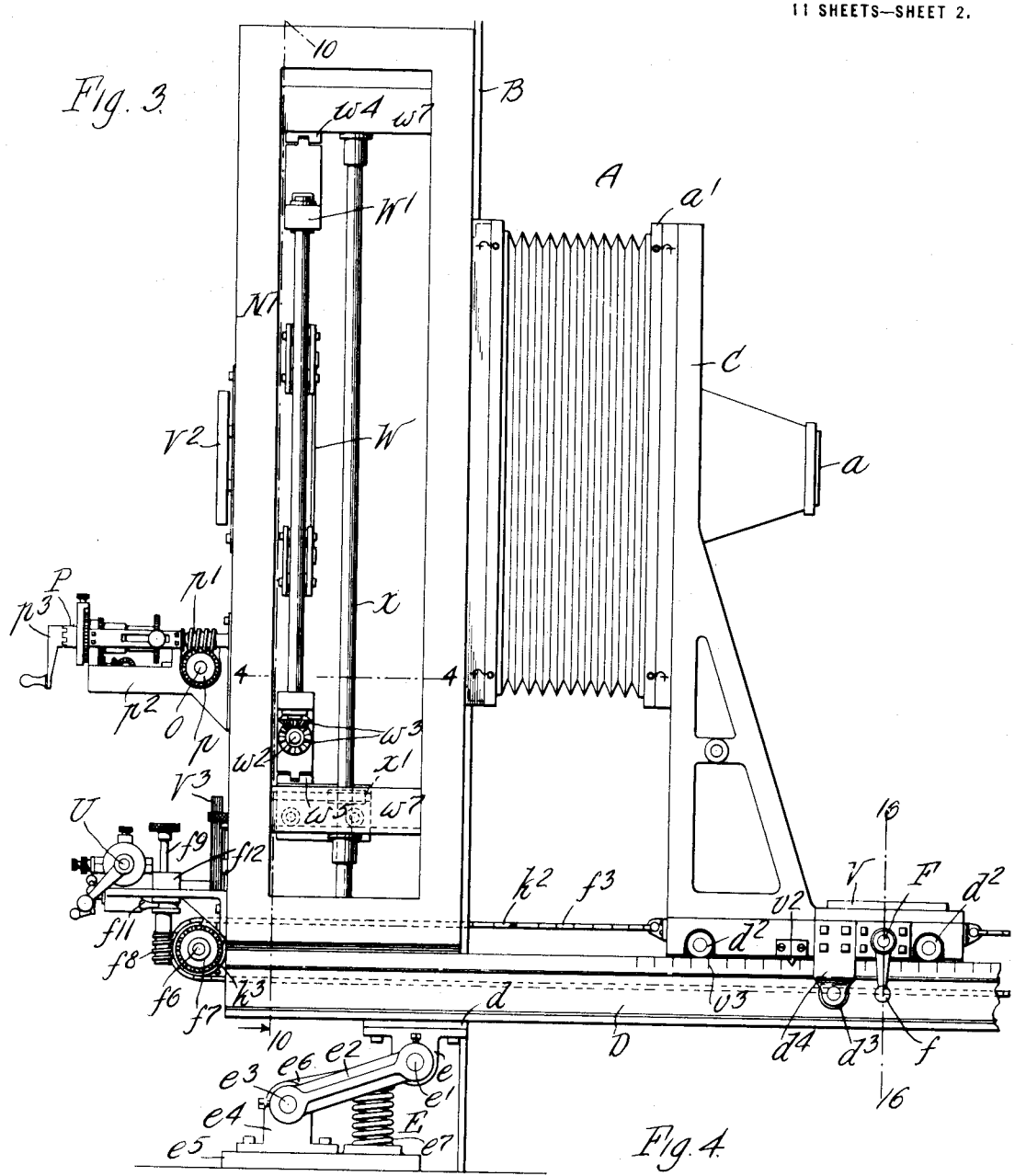
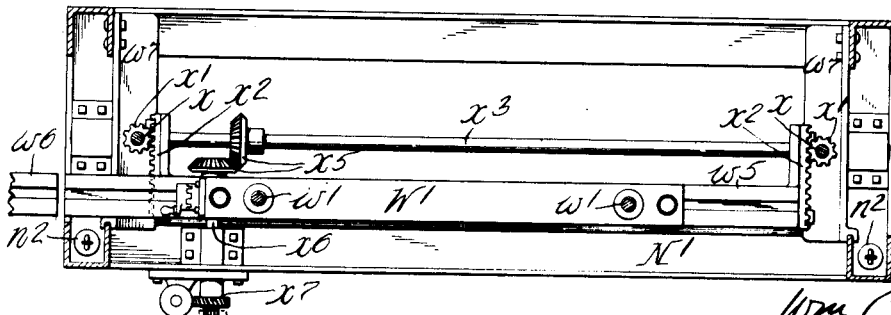

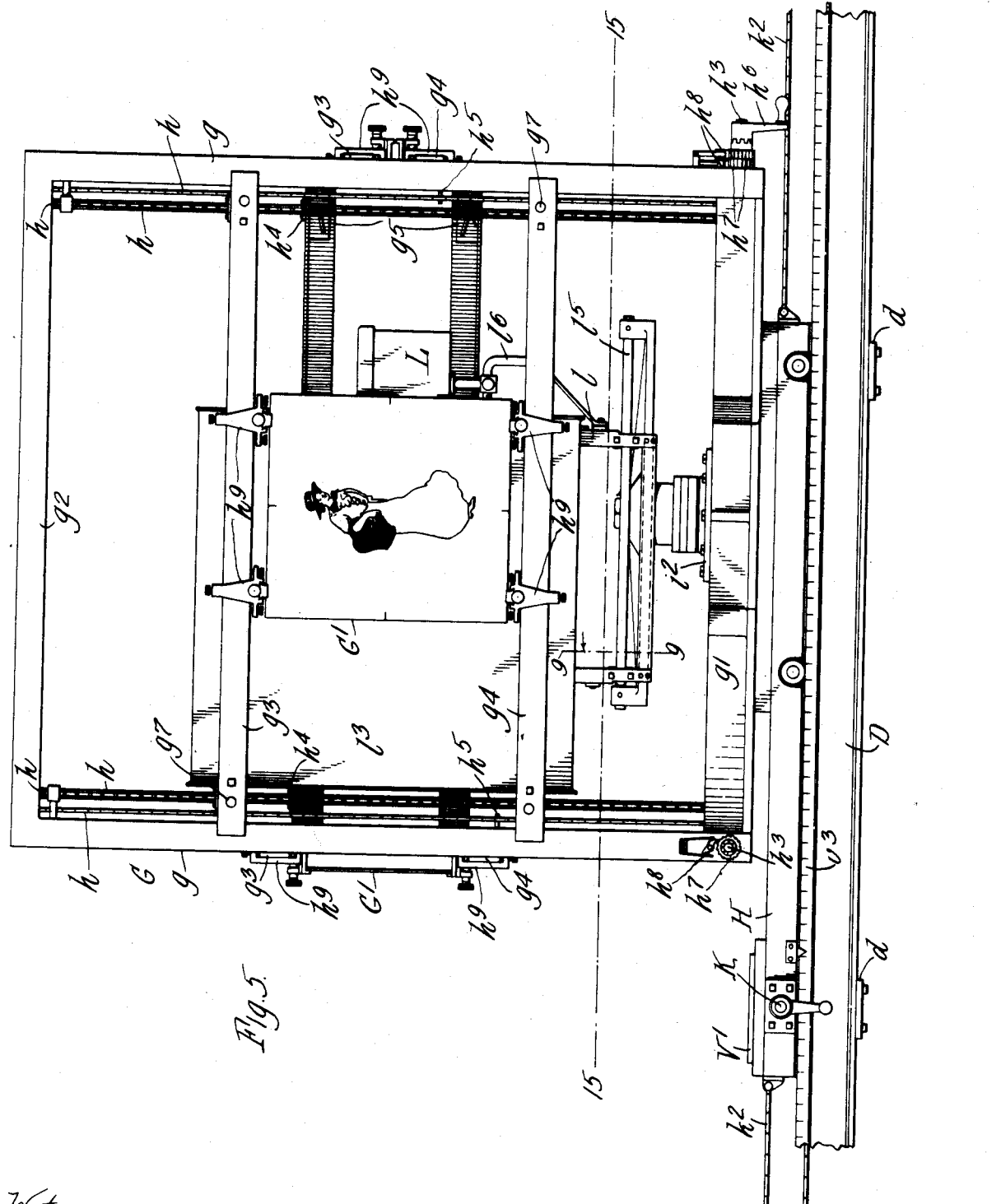

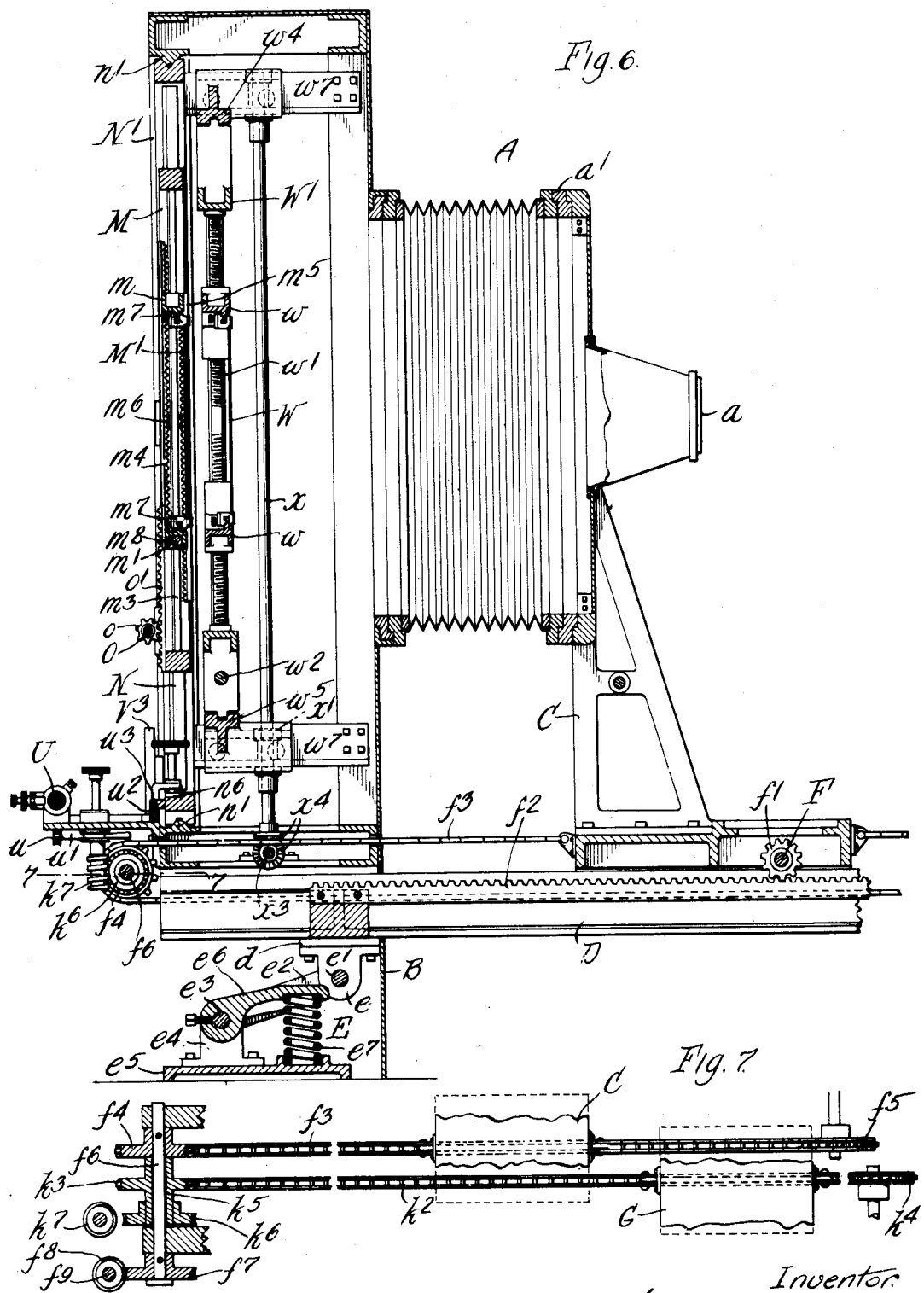

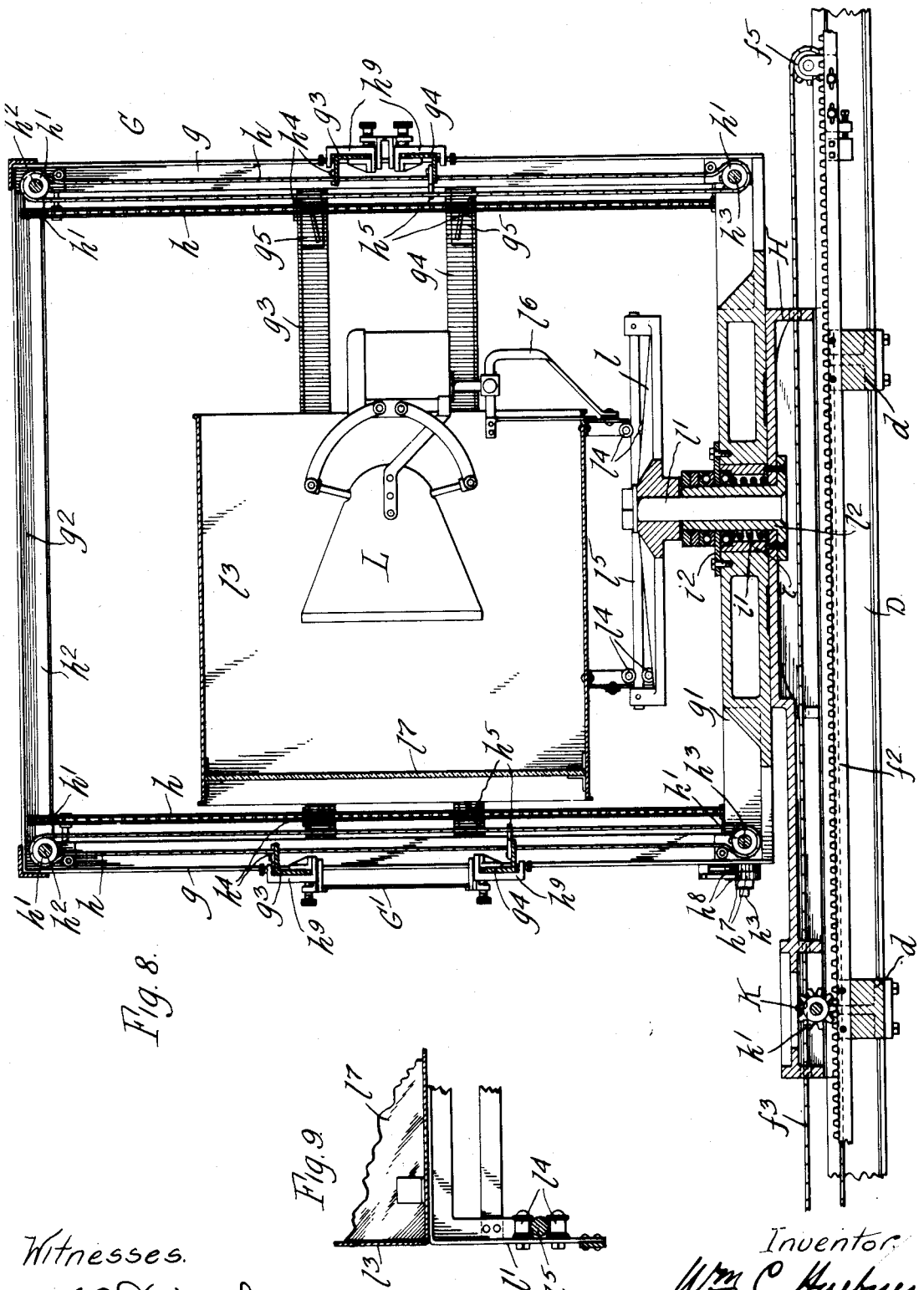

W. C. HUEBNER.
PHOTOGRAPHIC APPARATUS.
APPLICATION FILED OCT. 9, 1914.
1,195,225.　　　　　　　　　Patented Aug. 22, 1916.
11 SHEETS—SHEET 6.
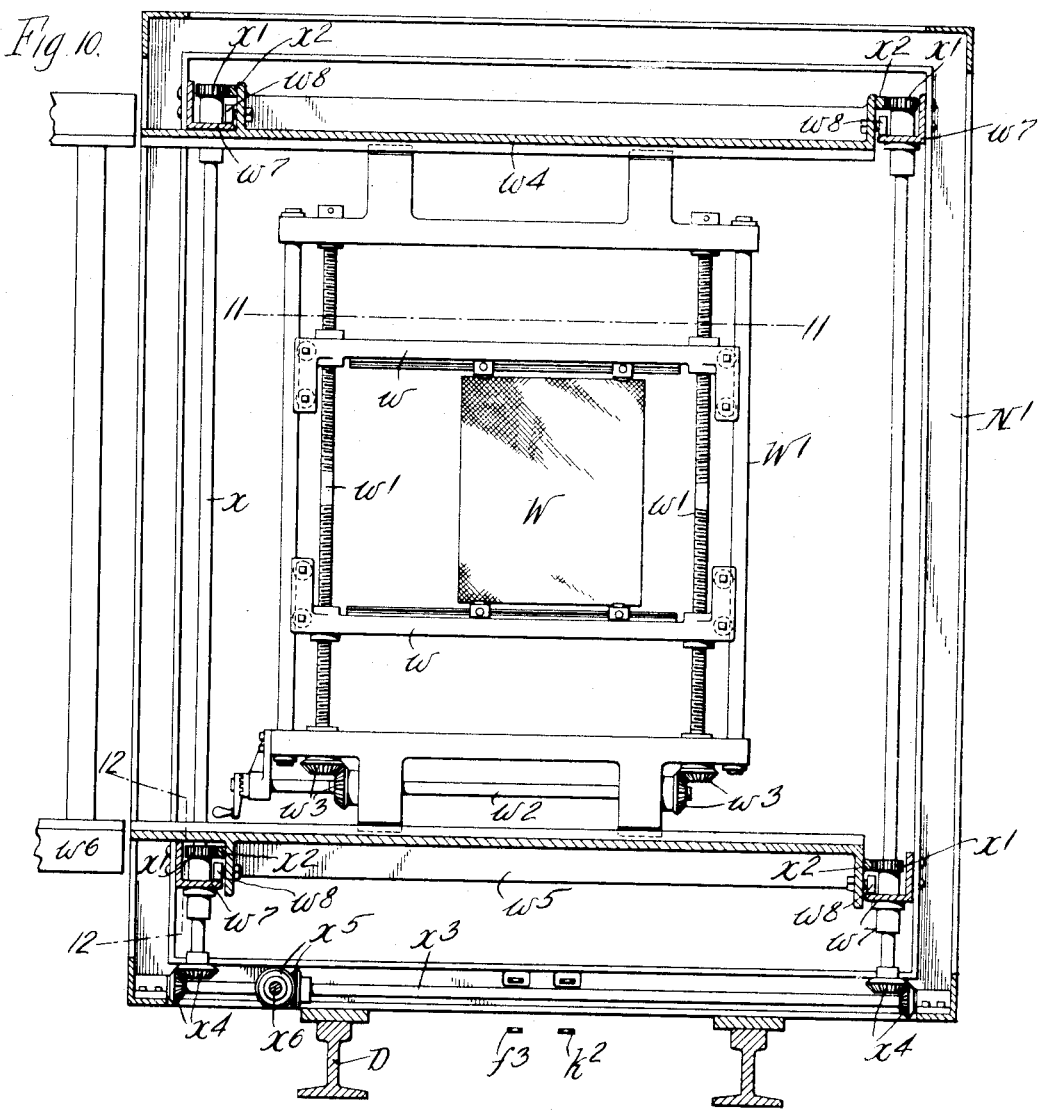
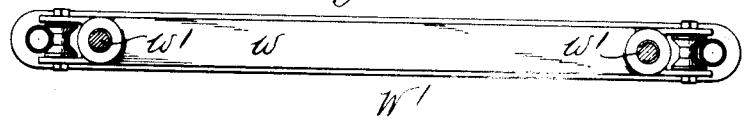
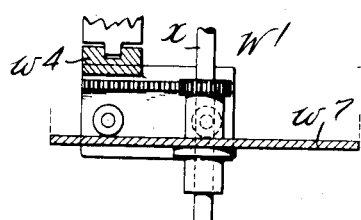

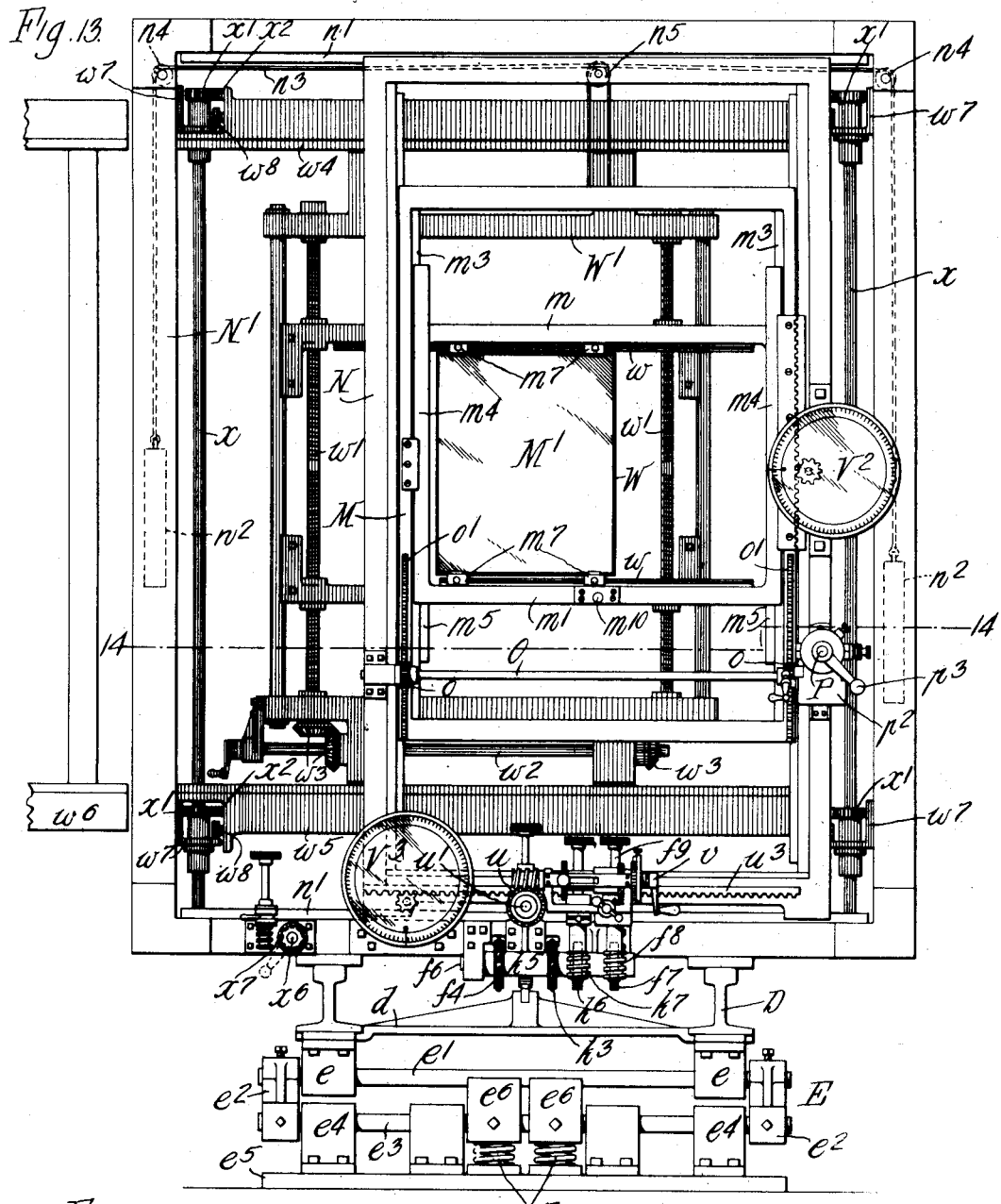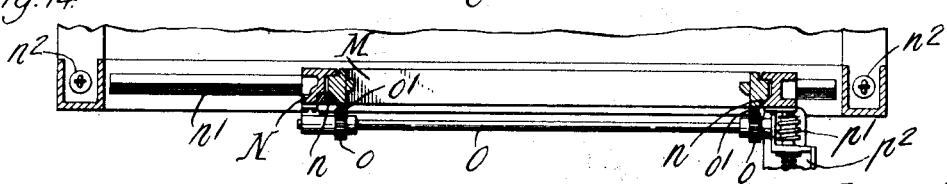

W. C. HUEBNER.
PHOTOGRAPHIC APPARATUS.
APPLICATION FILED OCT. 9, 1914.
1,195,225.
Patented Aug. 22, 1916.
11 SHEETS—SHEET 8.
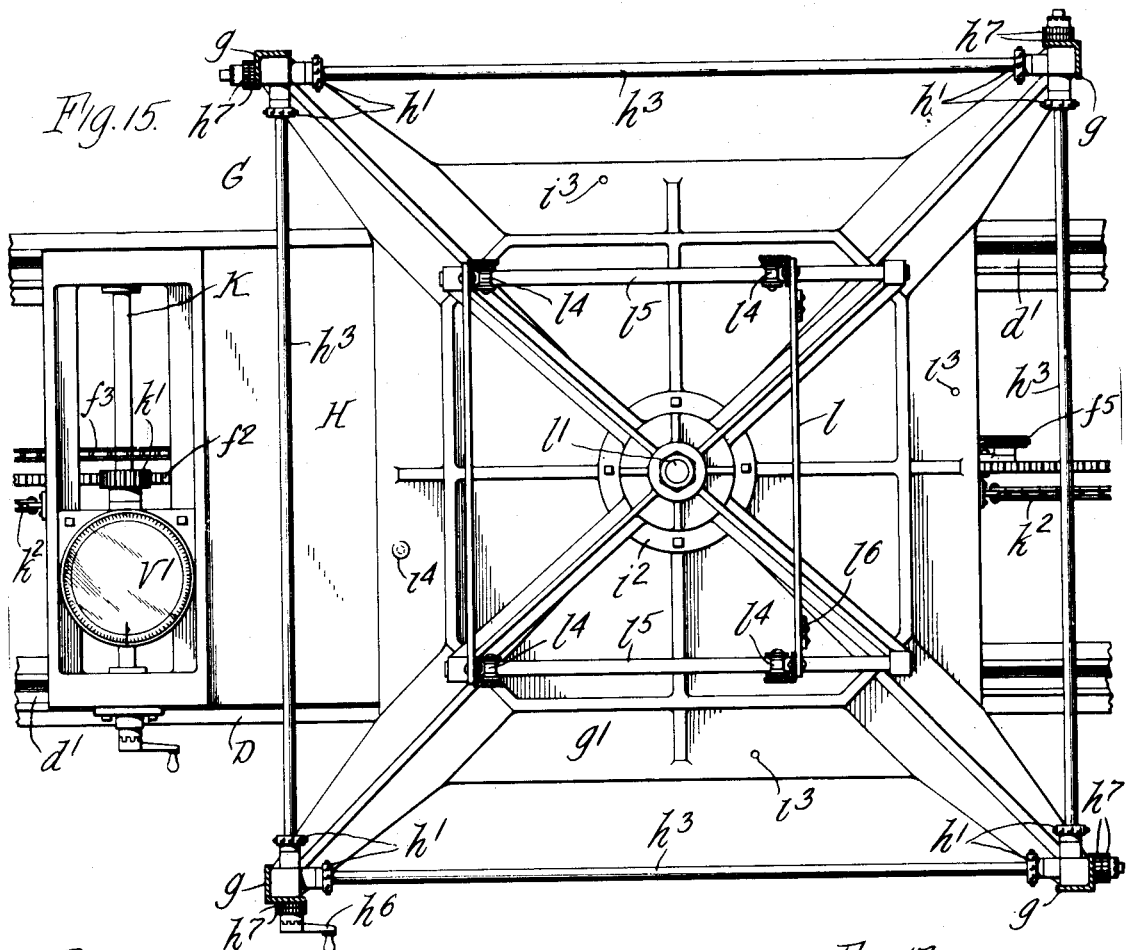
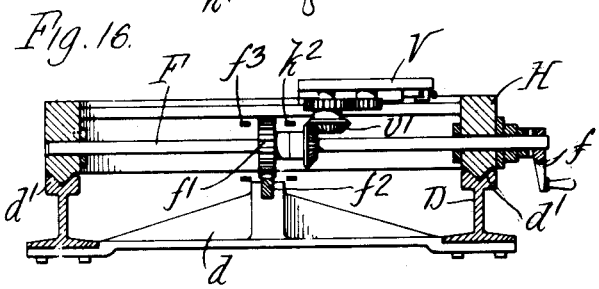
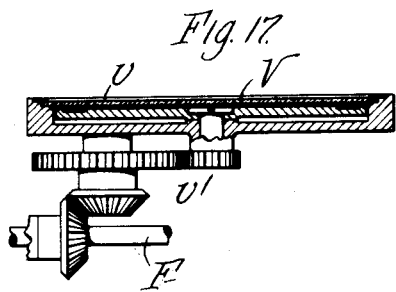

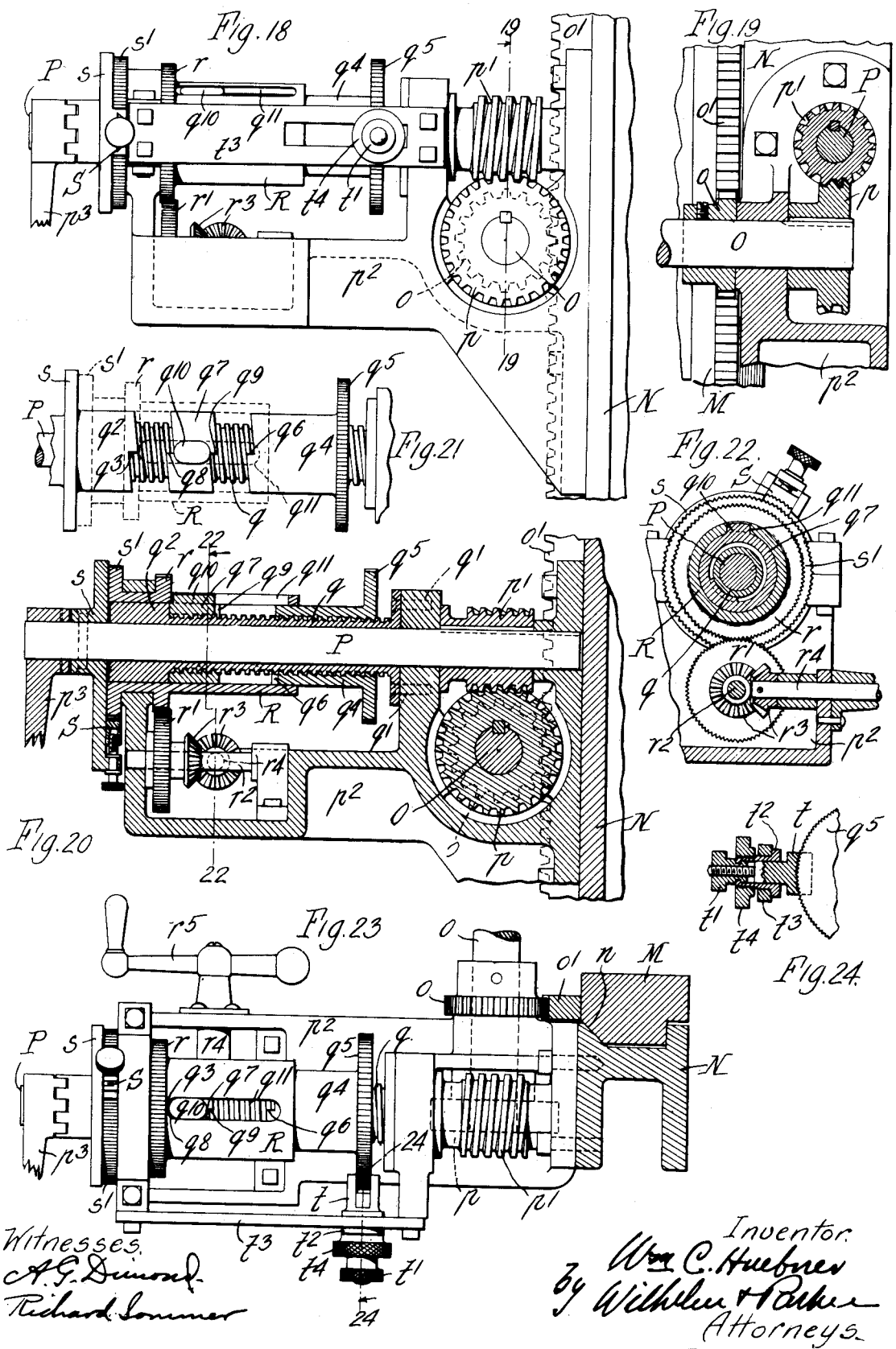

W. C. HUEBNER.
PHOTOGRAPHIC APPARATUS.
APPLICATION FILED OCT. 9, 1914.
1,195,225.
Patented Aug. 22, 1916.
11 SHEETS—SHEET 10.
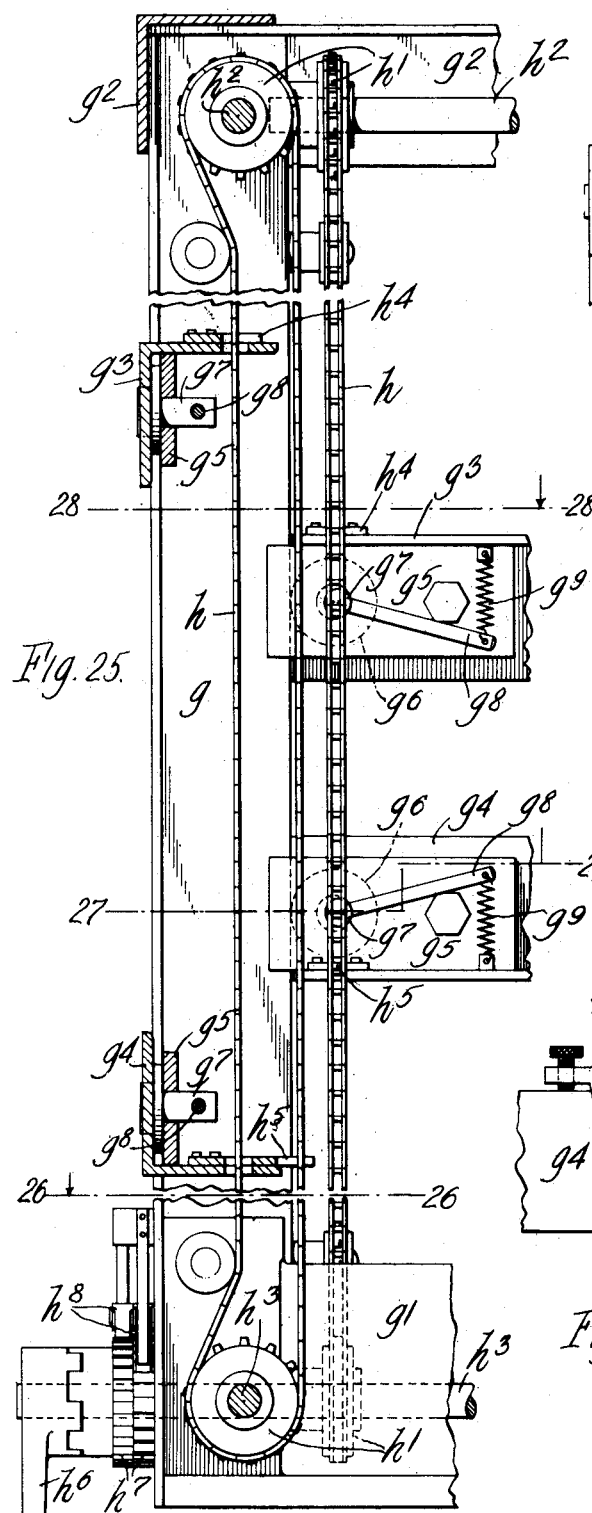
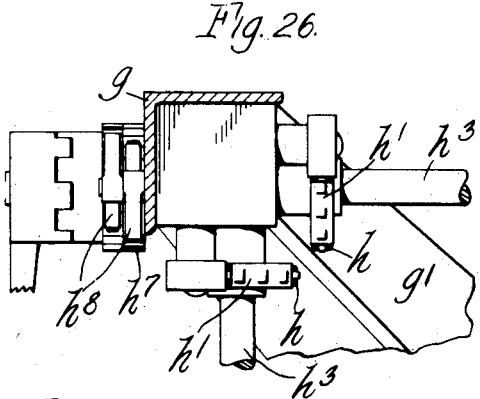
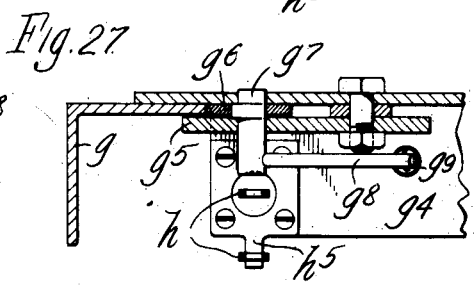
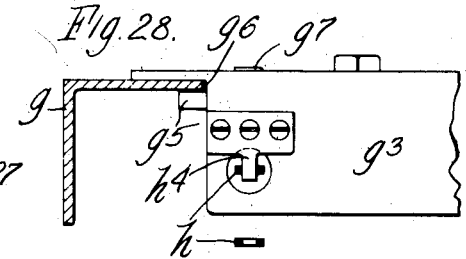
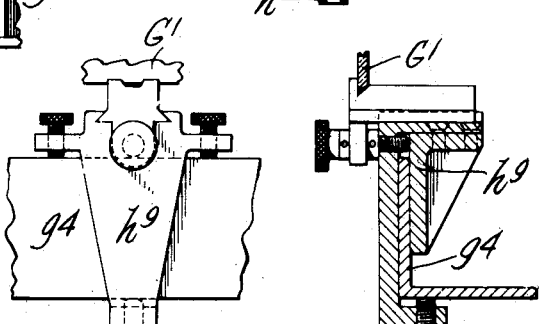
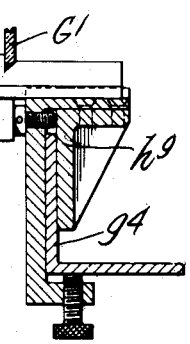
Witnesses.
Inventor.
Wm C. Huebner
by Wilhelm & Parker
Attorneys.

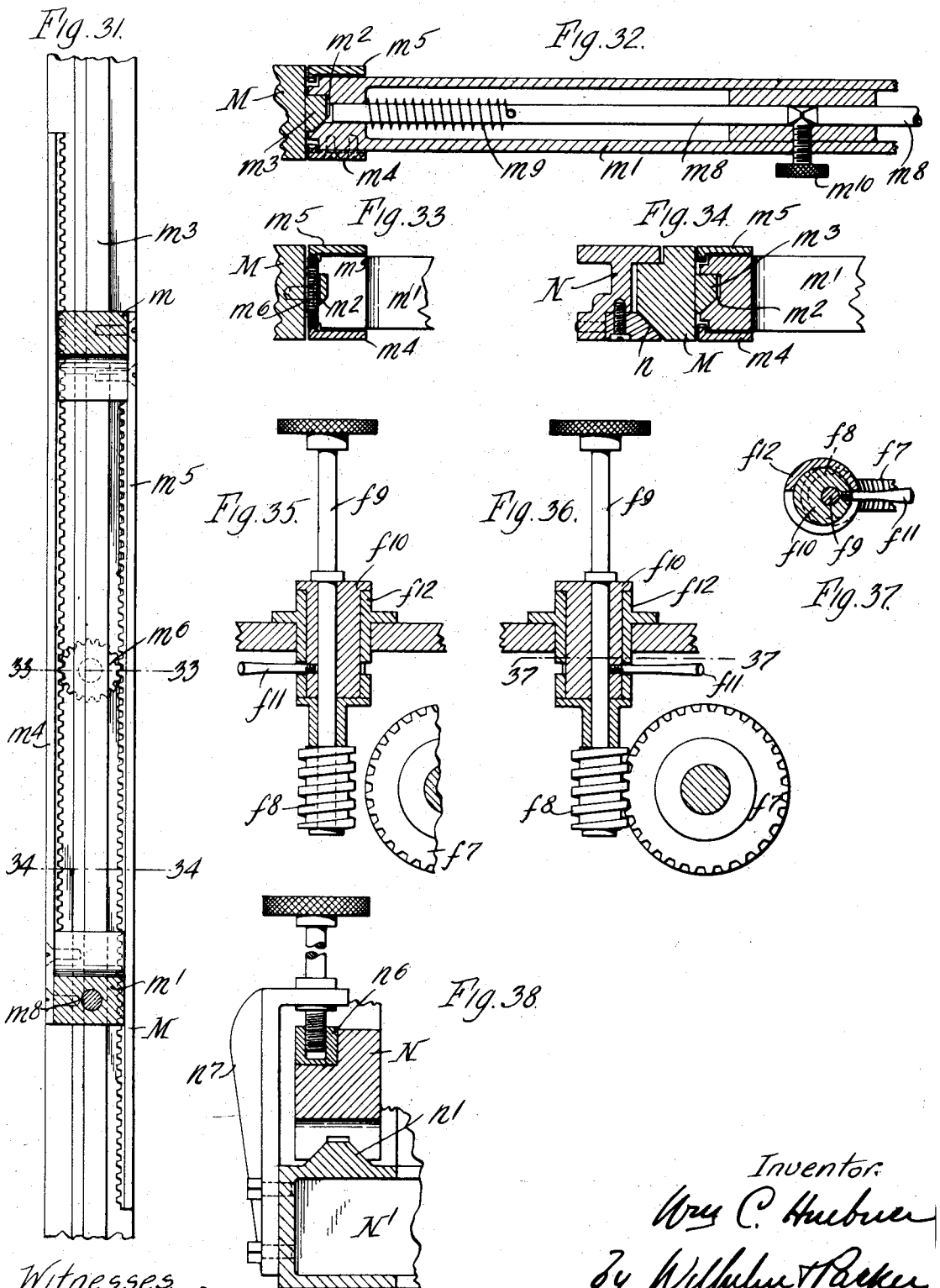

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC APPARATUS.

1,195,225.   Specification of Letters Patent.   Patented Aug. 22, 1916.

Application filed October 9, 1914. Serial No. 865,838.

*To all whom it may concern:*

Be it known that I, WILLIAM C. HUEBNER, a citizen of the United States, residing at Buffalo, in the county of Erie and State of New York, have invented a new and useful Improvement in Photographic Apparatus, of which the following is a specification.

This invention relates to apparatus for reproducing photographically, with or without enlargement or reduction, pictures or subjects in predetermined positions or relations on one or more photographic plates or other sensitized surfaces. The apparatus is especially adapted for repeating or making a plurality of prints of a subject in a predetermined arrangement and on a desired scale on a photographic negative or printing plate, and for grouping prints of different subjects in a desired relative arrangement and on any desired scale on a single photographic printing plate. The apparatus is likewise adapted for use in conjunction with multicolor printing, where it is essential that the reproductions of the picture or subject on the printing surfaces for the different colors be in exactly corresponding positions and on the same scale.

The object of this invention is to improve the construction of apparatus of this nature in various respects hereinafter described and set forth in the claims, so as to increase the capacity of the apparatus, reduce the exertion necessary to the operation of the same, and improve the quality of the work produced.

In common with apparatus heretofore employed for similar purposes, the apparatus comprises a photographic projecting device provided with one or more projecting lenses; a holder or carrier for supporting the plate or other object bearing the picture or subject to be reproduced; a holder or carrier for supporting the glass or other plate or body having the sensitized surface on which the reproductions are made; an adjustable holder for supporting a half tone or mezzo screen in operative relation to the sensitized surface; and means for illuminating the picture or subject. For convenience in description, the first mentioned holder is hereinafter termed the "subject holder" and the other holder the "plate holder". The projecting device or lens and the subject holder are adjustable longitudinally or in the optical axis relative to each other and to the plate holder, for properly focusing the lens and for determining the scale of the reproductions, and the plate holder is adjustable in directions at right angles to each other in a plane transverse to the optical axis, to enable the reproductions to be made in the desired position or positions on the sensitized surface or surfaces.

Figure 2:
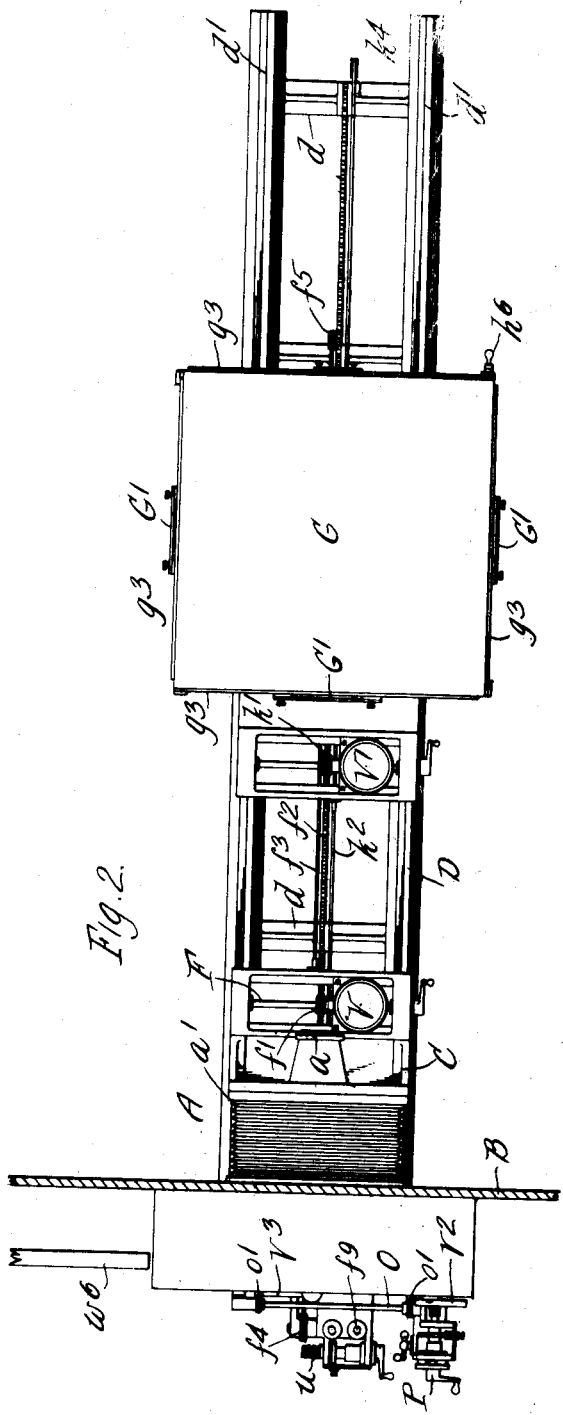

In the accompanying drawings: Figure 1 is a side elevation, on a reduced scale, of a photographic apparatus embodying the invention. Fig. 2 is a plan view thereof. Fig. 3 is a side elevation of the front end portion of the apparatus. Fig. 4 is a sectional plan view in line 4—4, Fig. 3. Fig. 5 is a side elevation of the subject holder and supporting track. Fig. 6 is a longitudinal sectional elevation of the plate holder and projecting device. Fig. 7 is a view partly diagrammatic and partly in section on line 7—7, Fig. 6, showing the adjusting mechanisms for the subject holder and projecting device. Fig. 8 is a longitudinal sectional elevation of the subject holder. Fig. 9 is a fragmentary sectional elevation of the illuminating means, on an enlarged scale, on line 9—9, Fig. 5. Fig. 10 is a transverse sectional elevation of the apparatus on line 10—10, Fig. 3. Fig. 11 is a sectional plan view of the screen holder on line 11—11, Fig. 10. Fig. 12 is a sectional elevation, enlarged, of the adjusting mechanism for the screen holder on line 12—12, Fig. 10. Fig. 13 is a front end elevation of the apparatus. Fig. 14 is a fragmentary sectional plan view of the apparatus on line 14—14, Fig. 13. Fig. 15 is a plan view of the apparatus, partly in section, on line 15—15, Fig. 5. Fig. 16 is a transverse sectional elevation of the apparatus in line 16—16, Fig. 5. Fig. 17 is an enlarged sectional elevation of the adjustment indicator for the subject holder. Fig. 18 is a side elevation, enlarged, of the adjusting mechanism for the plate holder. Fig. 19 is a transverse sectional elevation thereof on line 19—19, Fig. 18. Fig. 20 is a longitudinal sectional elevation thereof. Fig. 21 is a detached fragmentary plan view of the coöperating stop devices of the adjusting mechanism. Fig. 22 is a transverse sectional elevation of the adjusting mechanism on line 22—22, Fig. 20. Fig. 23 is a plan view thereof. Fig. 24 is a section of the lock device for the adjustable stop on line 24—24, Fig. 23. Fig. 25 is an enlarged fragmentary sectional elevation of the subject holder. Fig. 26 is a sectional plan view thereof on line 26—26, Fig. 25. Figs. 27 and 28 are sectional plan views thereof on lines 27—27 and 28—28, respectively, Fig. 25. Figs. 29 and 30 are respectively a front elevation and a section of one of the holder clamps. Fig. 31 is an enlarged fragmentary sectional elevation of the plate holder. Fig. 32 is a horizontal section of the lower holding bar of the plate holder. Figs. 33 and 34 are horizontal sections of the plate holder on lines 33—33 and 34—34, respectively, Fig. 31. Figs. 35 and 36 are enlarged sectional elevations of the fine adjusting gearing for the projecting device, respectively showing the inoperative and operative positions of the driving worm. Fig. 37 is a section on line 37—37, Fig. 36. Fig. 38 is an enlarged sectional elevation of the locking clamp for the plate holder carriage.

A represents the projecting device or camera which may be of any suitable construction, and comprises, as usual, a projecting lens $a$ and an extensible hood or camera box $a'$ to the movable end of which the lens is connected. The projecting device is located between the subject and the sensitized surface, which are located at opposite sides of an opaque wall or light screen B of any construction adapted to properly screen the sensitized surface from light. The movable end of the camera and the projecting lens $a$ are carried by a suitable upright frame or support C which is mounted so as to be adjustable longitudinally, or in the direction of the optical axis, for focusing the lens, on a supporting track D. In the construction shown, the track consists of parallel horizontal rails connected by cross ties or bars $d$ and provided on their top faces with V-shaped guide grooves $d'$ in which corresponding guide tongues on the bottom of the support C are adapted to slide, and the support has wheels $d^2$ which travel on the rails to relieve the guides, in part at least, from the weight of the support C and parts carried thereby. Wheels $d^3$ journaled in depending brackets $d^4$, Fig. 3, on the opposite sides of the support C and rolling against the under faces of the head flanges of the track rails prevent the support from tipping on the track. The track D could be of any other suitable construction and the support C could be supported and guided thereon in any other suitable way. The subject holder and plate holder are also supported by the track D.

In order to relieve the apparatus from disturbance, due to the jarring or vibration of the floor or foundation on which it is erected, the track is mounted on yielding or spring supports E, preferably as follows, see Figs. 1, 3, 6 and 13: The track is provided with depending bearings $e$ in which are journaled rock shafts $e'$. Arms $e^2$ fixed to the ends of these shafts are fixed to rock shafts $e^3$ which are adapted to rock in bearings $e^4$ on suitable base plates $e^5$ which rest on the supporting floor or foundation. Each of the rock shafts $e^3$ is provided between its supporting bearings with fixed rock arms $e^6$, the free ends of which bear on springs $e^7$ that rest on the base plates $e^5$. This spring mechanism provides a yielding or cushioned support for the track, and the rock shafts and arms act as equalizing devices so that any movement of one side of the track will be accompanied by a corresponding movement of the opposite side of the track, thereby preventing the apparatus from being tilted or distorted out of its proper upright position.

The projecting device is preferably adjusted longitudinally on the track D by the following mechanism, which enable the adjustment to be effected with ease and rapidity and with great precision: F, Figs. 1, 3, 6, and 16, represents an adjusting shaft which is journaled in the base of the support C and is provided at one end with a crank or handle $f$ for turning it, and between its end with a pinion $f'$ which meshes with a toothed rack $f^2$ which is secured to the cross ties of the track D lengthwise between the rails thereof. The projecting device can be quickly adjusted in either direction by turning this adjusting shaft in the proper direction. In addition to this adjusting mechanism, a chain or flexible connection $f^3$ is attached at opposite ends to the base of the support C and passes around chain wheels $f^4$ and $f^5$ suitably mounted on the track D in front and in rear of the support C for the projecting device. The chain wheel $f^4$ is secured to a shaft $f^6$, Figs. 6 and 7, journaled at the front end of the track adjacent to the holder for the sensitized plate where it is within easy reach of the operator who stands at this end of the apparatus when focusing the camera. The shaft $f^6$ is provided with a worm wheel $f^7$ with which a worm $f^8$ on an operating shaft $f^9$ is adapted to mesh for turning the shaft $f^6$. The worm $f^8$ is normally out of mesh with the worm wheel $f^7$ so as not to interfere with the adjustment of the projecting device by the coarse adjusting shaft F, but is adapted to be shifted into mesh with the worm wheel when it is desired to drive the chain $f^8$ for effecting a fine or precise adjustment of the projecting device. For this purpose the worm shaft $f^9$ is journaled eccentrically in a cylindrical bushing $f^{10}$, Figs. 35 and 36, which is adapted to be turned by a handle $f^{11}$ in a bearing $f^{12}$ at the front end of the apparatus for shifting the worm into and out of mesh with the worm wheel. When the worm is in mesh with the worm wheel the projecting device can be accurately adjusted by turning the worm shaft $f^9$.

G represents the subject holder or support for the plate or object G' bearing the picture or subject to be reproduced. This holder or support, which is arranged in rear of the projecting device, is swiveled or pivoted to turn about a vertical axis on a supporting carriage H movable longitudinally on the track D, and is provided with means for securing a picture or subject on each of its upright sides, so that by turning the subject holder any one of the pictures or subjects thereon can be placed in operative position in rear of the projecting device. The subject holder or support preferably consists of a hollow or box-like frame composed of upright corner posts $g$ of angle-iron rising from the four corners of a bottom frame or spider $g'$ and connected at their upper ends by horizontal bars $g^2$. The holder or frame G is provided on each of its four upright sides with means for securing a picture or subject G' in upright position thereon. Each of the holding means consists of upper and lower horizontal bars $g^3$ $g^4$ between which the subject or picture is held, and which are arranged to slide vertically on the corner posts $g$ of the holder frame toward and from each other to accommodate pictures or subjects of different sizes. Each holding bar, see Figs. 25–30, preferably consists of an angle bar, and the flanges of the corner posts $g$ extend in between the ends of the vertical flanges of the holding bar and guide plates $g^5$ secured thereon for slidably retaining the holding bar on the corner posts. Circular disks or rollers $g^6$ arranged at the ends of the holding bar, between the vertical flange thereof and the guide plates $g^5$, are adapted to travel against the edges of the flanges of the corner posts. These disks are carried by axles $g^7$ which are journaled eccentrically of the disks in holes on the holding bar and guide plates $g^5$, and the axles are provided with rock arms $g^8$ connected by springs $g^9$ to the holding bar. These springs tend to rock the axles $g^7$ in their bearings and hold the rollers yieldingly in contact with the edges of the corner posts, thereby preventing endwise play or shifting of the holding bars. This construction insures the free movement of the holding bars on the corner posts and prevents endwise play or shifting of the holding bars without necessitating the machining of the corner posts or holding bars.

For simultaneously and correspondingly moving the holding bars $g^3$ $g^4$ toward and from each other to engage and release the picture or subject, they are, in the construction shown, attached to a pair of endless chains $h$ which pass around chain wheels $h'$ on horizontal shafts $h^2$ $h^3$ at the upper and lower ends of the holder frame G. The upper holding bar $g^3$ is attached by a finger or device $h^4$ of any suitable sort to one run of each of the chains, while the lower bar $g^4$ is similarly attached by a finger or device $h^5$ to the other run of each of the chains. In this way, when the chains are driven in one direction the bars will be simultaneously moved away from each other to corresponding distances above and below the vertical center of the holder frame, whereas by driving the chains in the opposite direction the bars will be simultaneously and correspondingly moved toward each other. The chains can be driven for actuating the bars, for instance, by rotating the lower shaft $h^3$ by means of a suitable crank or handle $h^6$ at one end of the shaft. The shaft is also preferably provided with oppositely arranged ratchet wheels $h^7$ coöperating with dogs $h^8$ for holding the chains and holding bars in the positions to which they are adjusted. The holding bars $g^3$ $g^4$ are provided with clamps or devices $h^9$ of any suitable sort which are adjustable along the holding bars for engaging the edges of pictures or subjects of different widths to hold the same in position between the bars. The holding bars on each side of the subject holder are similarly constructed, mounted and operated, the holding means on each side of the subject holder being independent of the means on the other sides so as to permit a picture or subject to be secured on or removed from any side of the holder at will.

The subject holder G can be swiveled on its supporting carriage H to turn about a vertical axis in any convenient way. Preferably, however, the base of the subject holder bears upon and is adapted to turn on the flat upper face of the carriage H, and the carriage is provided with an upright hollow pivot post $i$ which extends up into a central hole in the base of the holder. A spring $i'$ located in the hollow pivot post supports an anti-friction bearing on which a plate $i^2$ secured to the base of the subject holder rests, the spring thus tending to lift the holder and relieve the pressure of the same on the flat top of the carriage.

Any suitable means can be employed for securing the subject holder with the picture or subject on any side thereof in operative relation with the projecting device. For instance, the base of the holder frame is provided at each side with a pin hole $i^3$, Fig. 15, through which a pin $i^4$ is adapted to be dropped into a registering hole in the top of the carriage H. This construction provides simple and efficient means for quickly and accurately securing the subject holder with the subject or picture on one side thereof in a plane at right angles to the optical axis.

A swiveled subject holder, such as described, enables one or more pictures or subjects to be secured and adjusted on one or more sides of the holder while reproductions are being made from another picture or subject, so that when the reproductions from one picture or subject are finished another picture or subject can be quickly moved into position for reproducing therefrom without loss of time, thereby greatly increasing the rapidity of operation of the apparatus. Furthermore, the sides of the subject holder at the side and rear of the apparatus are in convenient positions for placing the pictures thereon and removing them, and the subject holder does not have to be backed away from the projecting device to afford the necessary room as would be the case with a holder having provision for holding only one picture or subject and which is movable only toward and from the projecting device.

The carriage H for the subject holder is preferably arranged to travel longitudinally on the track D in substantially the same way as the support C for the projecting device and is adjusted thereon by coarse and fine adjusting mechanism similar in construction and operation to the coarse and fine adjusting mechanism for the projecting device.

K, Figs. 1, 5, 7 and 15, represents the coarse adjusting shaft which is journaled transversely in the carriage and is provided with a pinion $k'$ meshing with the rack $f^2$.

$k^2$ represents a chain which is attached at opposite ends to the carriage and passes around chain wheels $k^3$ $k^4$ arranged adjacent to the front and rear ends of the track. The chain wheel $k^3$ at the front end of the track is secured to a hollow shaft $k^5$, Fig. 7, which surrounds and is adapted to turn on the shaft $f^6$. This hollow shaft $k^5$ is provided with a worm wheel $k^6$ adapted to be turned by a worm $k^7$ which is adapted to be shifted into and out of mesh with the worm wheel as explained in connection with the other fine adjusting worm $f^8$, and to be turned for driving the chain $k^2$ to effect a fine or precise adjustment of the subject holder.

When the picture or subject to be reproduced is on an opaque plate or object it can be illuminated by reflected light in any usual or suitable way, as, for instance, by lamps (not shown) suitably placed in the room in which the apparatus is located. When, however, the picture or subject is on a glass or transparent plate, such as a photographic negative, it is illuminated by transmitted light from an electric lamp or other suitable source of light L arranged inside of the swiveled subject holder. This lamp L is mounted on a frame or support $l$ which is supported from the carriage H inside of the subject holder frame G so that the latter is adapted to rotate about the lamp and its support. The lamp support shown, see Figs. 8, 9 and 15, consists of a horizontal skeleton frame which is secured by a central post $l'$ on the upper end of a stationary sleeve $l^2$ which is secured to the carriage H and projects up through the hollow pivot post for the subject holder. The lamp is mounted in a surrounding shield or casing $l^3$ provided with wheel supports $l^4$ adapted to travel on guide rods $l^5$ at the opposite sides of the support $i$. The lamp is adapted to be moved on these guide rods toward and from the picture or subject on the front side of the subject holder.

$l^6$ represents a handle secured to the shield or casing $l^3$ for thus moving the lamp.

$l^7$ is a ground glass in the front end of the lamp casing for diffusing the light from the lamp. When the lamp is being used it can be moved forwardly on its support to the required distance from the picture or subject, and when it is desired to turn the subject holder G to place the subject on another side thereof in position for reproduction, the lamp can be moved backwardly to a central position in the subject holder frame so as not to interfere with the rotation of the latter about the lamp.

M, Figs. 6, 13 and 31, represents the holder for the sensitized plate M' on which the reproductions are made. This plate holder is mounted at the front of the apparatus on an upright plane perpendicular to the optical axis so as to be adjusted vertically and horizontally in said plane in order to place any desired portion of the sensitized surface in position to receive the reproduction of the subject. The plate holder may be constructed and mounted for vertical and horizontal adjustments in any suitable way. As shown, it consists of a rectangular frame arranged to slide vertically in an upright rectangular frame or carriage N which, in turn, is arranged to slide horizontally in a stationary rectangular support or frame. The plate holder is provided with upper and lower horizontal vertically movable holding bars $m$ $m'$ between which the sensitized plate is adapted to be secured. The holding bars are provided at their ends with grooves $m^2$, Figs. 32–34, by which they are adapted to slide on guide ribs $m^3$ on the opposite upright sides of the plate holder frame M. The lower holding bar $m'$ is provided with vertical bars $m^4$ which extend upwardly from its ends in front of the guide ribs $m^3$, and the upper holding bar is provided with vertical bars $m^5$ which extend downwardly from its ends in rear of the guide ribs $m^3$. Between the bars $m^4$ and $m^5$ are journaled, on the side bars of the plate holder frame, pinions $m^6$ which mesh with rack teeth on said bars $m^4$ $m^5$ so that a movement of one of the holding bars will produce an opposite movement of the other bar, whereby the holding bars will be caused to move simultaneously and equally in opposite directions toward and from the vertical center of the plate holder. The holding bars $m$ $m'$ are provided with holding clips or devices $m^7$, Fig. 6, of any suitable construction adapted to engage the upper and lower edges of the sensitized plate for securing the same in the plate holder. These clips are arranged to slide on guides on the holding bars so that they can be adjusted on the holding bars toward and from each other, as may be necessary to properly engage plates of different dimensions. The holding bars $m$ $m'$ are adapted to be moved by hand until the clips thereon bear properly against the upper and lower edges of the sensitized plate, and are preferably secured in holding position by suitable means such, for instance, as locking rods $m^8$, Fig. 32, which are movable endwise in the lower holding bar $m'$ and are adapted to be forced apart to press their outer ends into holding engagement with the side bars of the plate holder. The locking rods are normally held inwardly out of engagement with said side bars by springs $m^9$ surrounding the locking rods, and are adapted to be forced outwardly into contact with the side bars by a thumb screw $m^{10}$ which works in a threaded hole in the holding bar $m'$ and has a rounded end engaging the conical inner ends of the locking rods. Any other suitable means for locking the holding bars when adjusted could be employed.

The plate holder M can be mounted to slide vertically in the carriage N and the latter can be mounted to slide horizontally in a suitable stationary supporting frame N' in any suitable manner. As shown, see Figs. 14 and 34, the plate holder M is provided at its side edges with beveled ribs which slide in guide-ways $n$ in the side bars of the carriage N, and the carriage N is provided at its top and bottom edges with guide grooves which slidably engage horizontal beveled guide ribs $n'$ on the top and bottom cross bars of the stationary frame N'. This frame is stationarily secured on the front end of the supporting track D and preferably consists, as shown, of connected front and rear upright rectangular frames.

$n^2$, Fig. 13, indicates weights for counterbalancing the weight of the plate holder M and the plate M'. Each of these weights is attached to one end of a cable or the like $n^3$ which passes over pulleys $n^4$ and $n^5$ on the stationary frame N' and the carriage N respectively, and is attached at its other end to the plate holder. These weights can be used or not, or other means employed for the purpose, as desired.

$n^6$, Figs. 5 and 38, represents a clamp for locking the carriage N when adjusted. This clamp consists of a hand screw supported by a bracket $n^7$ rising from the bottom of the stationary frame N' and provided at its lower end with a friction block which bears upon a horizontal ledge on the bottom of the carriage N. Any other suitable means could be employed for locking the carriage when adjusted.

The plate holder is preferably adjusted up and down in the carriage N by mechanism which enables the plate holder to be adjusted at will to any desired position, and by which it can also be quickly advanced up or down by successive movements or steps of any desired length for the purpose of making a succession of reproductions on the plate at predetermined distances apart vertically. Similar mechanism is also preferably provided for moving the carriage N to similarly adjust the plate holder horizontally in either direction.

The adjusting mechanism for the plate holder is constructed as follows: O, Figs. 13, 14 and 18–23, represents a horizontal shaft which is journaled in bearings on the side bars of the carriage N and is provided with pinions $o$ which mesh with vertical toothed racks $o'$ on the side bars of the plate holder. The shaft O is connected at one end by a worm wheel $p$ and a worm $p'$ with an adjusting or operating shaft or member P which is journaled in a suitable bearing bracket $p^2$ on the carriage N and is provided at its forward end with a crank or handle $p^3$ for turning it. By turning this operating shaft P, the plate holder can be moved up or down to any desired position. The adjusting shaft P, see Figs. 18–23, is adapted to turn in a stationary externally threaded screw sleeve $q$ which is secured at one end by screws $q'$ or otherwise to the bearing bracket $p^2$. The screw sleeve $q$ is provided at one end with a flange or stop member $q^2$ provided with a stop shoulder $q^3$, Fig. 21. Surrounding the screw sleeve $q$ and having a screwthreaded engagement therewith, is an adjustable stop sleeve or member $q^4$, which is provided with a toothed flange $q^5$ for turning it on the screw sleeve and is provided at its end adjacent to the stop $q^2$ with a stop shoulder $q^6$, see Fig. 21. Surrounding the screw sleeve $q$ between the stationary and adjustable stops $q^2$ and $q^4$ is a traveling stop member or nut $q^7$ which is provided at one end with a stop shoulder $q^8$ adapted to engage the stationary stop shoulder $q^3$ and on the opposite end with a stop shoulder $q^9$ adapted to engage the adjustable stop shoulder $q^6$. The traveling stop $q^7$ has an internal thread engaging the thread of the screw sleeve $q$, so that if this stop is rotated it will be moved longitudinally on the screw sleeve. The stop $q^7$ is rotated by a lug $q^{10}$ thereon which extends into and is adapted to move longitudinally in a slot $q^{11}$ in a hollow shaft R which surrounds and is adapted to turn on the enlarged end of the screw sleeve, and on the adjustable stop sleeve $q^4$. This hollow shaft R is turned by a gear flange $r$ thereon meshing with a pinion $r'$ secured to a shaft $r^2$ which is journaled below the hollow shaft R in the bracket $p^2$ and is connected by beveled pinions $r^3$ to a laterally extending operating shaft $r^4$ provided at its outer end with a handle $r^5$ for turning it. When the handle $r^5$ is turned the gearing connecting it with the hollow shaft R rotates the latter and moves the traveling stop along the screw sleeve $q$ in one direction or the other, depending upon the direction of rotation of the handle, until the traveling stop is arrested by contact with one of the coöperating stops $q^2$ $q^4$. The hollow shaft R could be rotated by any other suitable means. The hollow shaft R is adapted to be locked to the adjusting shaft P to turn therewith by any suitable means, such, for instance, as a screw-operated block S carried by a collar $s$ on the adjusting shaft and provided with teeth adapted to engage fine teeth on the periphery of a flange $s'$ at the forward end of the hollow shaft R. If the hollow shaft R is locked to the adjusting shaft P by the lock S and the adjusting shaft is turned by means of its handle, the hollow shaft R will rotate the traveling stop and move it along on the screw sleeve $q$ until it is arrested by engagement with the adjustable stop $q^4$. Thus by first moving the traveling stop into contact with the stationary stop and locking the hollow shaft R to the adjusting shaft P, the latter is adapted to be operated to move the plate holder a definite distance, determined by the adjustment of the adjustable stop sleeve $q^4$. When the plate holder has thus been advanced one step, the lock S is released to disconnect the hollow shaft R from the adjusting shaft P, and the traveling stop $q^7$ is returned to the initial position in contact with the stationary stop $q^2$ by turning the hollow shaft R independently of the adjusting shaft P by means of the operating handle $r^5$. By then again locking the hollow shaft R to the adjusting shaft P the latter can be turned and the plate holder advanced until again arrested by engagement of the traveling stop with the adjustable stop $q^4$. By repeating this operation the plate holder can be advanced by successive movements or steps of equal length and the length of each step movement can be determined as required, by the proper adjustment of the adjustable stop sleeve $q^4$. The plate holder can be similarly adjusted in the opposite direction by successive steps of any desired length by similarly operating the adjusting mechanism, but in the opposite direction, to cause the traveling stop $q^7$ to move from a position in engagement with the adjustable stop $q^4$ until it is arrested by contact with the stationary stop $q^2$. The adjusting mechanism can also be utilized for adjusting the plate holder definite distances of any desired length whether equal or unequal. The several coöperating stops preferably have helical end faces of the same pitch as the thread of the screw sleeve, and the stop shoulders $q^3$ $q^6$ $q^8$ $q^9$ on the several stops are of a length such that, in one revolution of the traveling stop $q^7$, the stop shoulder thereon will move from a position in which it engages the coöperating stop shoulder for its full length to a position in which it will clear or pass such shoulder. This prevents any motion of the traveling stop after it engages the coöperating stop and insures a positive and certain action of the stop mechanism.

The adjustable stop sleeve can be held stationary when adjusted, by any suitable lock device. The lock shown for the purpose, see Figs. 23 and 24, consists of a bifurcated block $t$ adapted to straddle the toothed flange $q^5$ of the adjustable stop and has teeth at the inner end of its slot adapted to engage the toothed edge of the flange. This block is moved toward and from the flange $q^5$ by a thumb nut $t'$ engaging a threaded shank on the block $t$, and arranged to turn in a sleeve $t^2$ in which the lock block slides. The sleeve $t^2$ is arranged to slide parallel with the adjusting shaft P in a slotted stationary bar $t^3$ on the bracket $p^2$. The sleeve $t^2$ is flanged and provided with a thumb nut $t^4$ for clamping it stationarily on the bar $t^3$. When it is desired to adjust the adjustable stop sleeve $q^5$ the nuts of the lock are loosened and the stop sleeve is turned by means of its toothed flange. The lock will be slid along the slotted bar $t^3$ by reason of the engagement of the forked locking block with the flange $q^5$ of the stop sleeve, and when the stop is adjusted it is locked by tightening the nuts $t'$ and $t^4$.

The mechanism for adjusting the plate holder carriage N horizontally is substantially similar in construction and operation to the mechanism just described for adjusting the plate holder vertically in the carriage.

U, Figs. 3, 6 and 13, represents the adjusting shaft provided with a handle for turning it and connected by a worm gearing $u$ to a shaft $u'$ which is provided with a pinion $u^2$ meshing with a toothed rack $u^3$ on the bottom bar of the carriage N. The operation of the adjusting shaft U is controlled for regulating the adjustment by coöperating stationary, adjustable and traveling stops and other parts similar to those described in connection with the vertical adjusting mechanism for the plate holder.

Indicators are preferably provided for showing in inches and minute fractions thereof the adjustments of the several adjustable parts of the apparatus.

V, Figs. 2, 3, 16 and 17, represents an adjustment indicator for the projecting device. This indicator consists of a rotary dial $v$ connected to the adjusting shaft P by gearing $v'$ which turns the dial one revolution for each inch of travel of the projecting device on the track D. The dial has a scale at its edge showing the movement of the projecting device in thousandths or other minute fractions of an inch. The movement of the projecting device in inches is indicated by a pointer $v^2$, Fig. 3, on the support C coöperating with a scale $v^3$ on the track D.

V' represents a similar adjustment indicator for the subject holder, and $V^2$ and $V^3$ represent respectively similar indicators for the plate holder M and plate holder carriage N. Indicators of any other suitable kind could be employed.

W represents a half tone, mezzo or other screen which is supported by a suitable holder W', Figs. 3, 4, 6 and 10–12, between the projecting device and the sensitized plate adjacent to the latter. The screen holder may be constructed, mounted and adjusted in any suitable manner. Preferably the holder consists of a rectangular frame provided with horizontal holding bars $w$ $w$ between which the screen is held and which are simultaneously adjusted toward and from each other by two screws $w'$ each having right and left-hand threads. These screws are operated by a shaft $w^2$ connected by bevel gears $w^3$ to each of the screws. The screen frame is arranged to slide parallel with the sensitized surface on upper and lower guide bars $w^4$ $w^5$ supported in the stationary frame N'. The screen holder can be slid sidewise in its guides to place the screen in the required position back of the sensitized surface, and it can be slid from between these guides out of the apparatus onto a suitable portable crane or support indicated at $w^6$, Fig. 10, for carrying the screen holder from place to place. The guide bars for the screen holder are mounted to move toward and from the plate holder on tracks or guides $w^7$ on the stationary frame N' for placing the screen in the required proximity to the sensitized surface. As shown, the guide bars $w^4$ are movably suppported on the tracks $w^7$ by rollers $w^8$ at the ends of the guide bars, and the guide bars are moved by vertical shafts $x$ which are journaled in the side portions of the stationary frame N' and have pinions $x'$ meshing with toothed racks $x^2$ on the ends of the guide bars. The shafts $x$ are turned simultaneously by a shaft $x^3$ at the bottom of the frame N' connected by bevel gears $x^4$ to the vertical shafts $x$. The connecting shaft $x^3$ is connected by bevel gears $x^5$ to an operating shaft $x^6$ which extends to the front of the plate holder and is adapted to be turned by a handle applied to its end or by a fine adjusting worm gearing $x^7$, such as used for adjusting the projecting device and subject holder.

I claim as my invention:

1. The combination of a photographic projecting device, a holder for a sensitized surface, and a subject holder which is provided on different sides thereof with independent holding means for a plurality of subjects and is movably mounted and adapted to be moved to place any one of said subjects in operative relation with said projecting device.

2. The combination of a photographic projecting device, a holder for a sensitized surface, and a subject holder which is provided on different sides thereof with holding means for a plurality of subjects and is rotatably mounted and adapted to be turned to place any one of said subjects in operative relation with said projecting device.

3. The combination of a photographic projecting device, a holder for a sensitized surface, and a subject holder which is provided on different sides thereof with independent holding means for a plurality of subjects and is movably mounted and adapted to be moved to place any one of said subjects in position facing said projecting device, said subject holder and projecting device being relatively adjustable for determining the size of the reproduction of the subject.

4. The combination of a photographic projecting device, a holder for a sensitized surface, a subject holder which is provided on different sides thereof with holding means for a plurality of subjects, and a carriage which is adjustable relative to said projecting device and on which said subject holder is rotatably mounted and adapted to be turned to place any one of said subjects in operative relation with said projecting device.

5. The combination of a photographic projecting device, a holder for a sensitized surface, and a subject holder comprising a frame mounted to turn about a vertical axis and means for holding a subject on each of a plurality of upright sides of said holder frame, said holder frame being adapted to be turned to place any one of said subjects in a plane at right angles to the optical axis of said projecting device.

6. The combination of a photographic projecting device, a holder for a sensitized surface, a subject holder comprising a hollow frame which is provided on different sides thereof with holding means for a plurality of subjects and is rotatably mounted and adapted to be turned to place any one of said subjects in operative relation with said projecting device, and illuminating means for said subjects located within said hollow frame.

7. The combination of a photographic projecting device, a holder for a sensitized surface, a subject holder comprising a hollow frame which is provided on different sides thereof with holding means for a plurality of subjects and is rotatably mounted and adapted to be turned to place any one of said subjects in operative relation with said projecting device, and means located within said hollow frame for illuminating the subject which is in operative relation with said projecting device, said hollow frame being rotatable about said illuminating means.

8. The combination of a photographic projecting device, a holder for a sensitized surface, a subject holder comprising a hollow frame which is provided on different sides thereof with holding means for a plurality of subjects and is rotatably mounted and adapted to be turned to place any one of said subjects in operative relation with said projecting device, and a lamp located within said hollow frame and about which said hollow frame is rotatable, said lamp being movable toward and from one side of said hollow frame.

9. The combination of a photographic projecting device, a holder for a sensitized surface, a subject holder comprising a hollow frame which is provided on different sides thereof with holding means for a plurality of subjects and is rotatably mounted and adapted to be turned to place any one of said subjects in operative relation with said projecting device, a stationary lamp support about which said hollow frame is rotatable, and a lamp which is mounted within said hollow frame on said support for movement toward and from one side of said hollow frame.

10. The combination of a photographic projecting device, a holder for a sensitized surface, a subject holder, a track on which said projecting device and holders are mounted for adjustment relative to each other, rock shafts provided with arms on which said track is mounted, and springs which yieldingly resist the oscillation of said rock shafts.

11. The combination of a photographic projecting device, a holder for a sensitized surface, a subject holder, a track on which said projecting device and holders are mounted for adjustment relative to each other, oscillating supports for said track, and springs which yieldingly resist the oscillation of said supports.

12. In a photographic apparatus, the combination of an adjustable holder for a sensitized surface, and mechanism for adjusting said holder by successive movements of predetermined length comprising an adjusting member operatively connected to said holder, a traveling stop adapted to be releasably connected to said adjusting member to move therewith, a coöperating stop for limiting the movement of said traveling stop in one direction, and means for returning said traveling stop to the initial position independently of said adjusting member.

13. In a photographic apparatus, the combination of an adjustable holder for a sensitized surface, and mechanism for adjusting said holder by successive movements of predetermined length comprising an adjusting member operatively connected to said holder, a traveling stop adapted to be releasably connected to said adjusting member to move therewith, a stop which coöperates with said traveling stop to limit the movement of said traveling stop and said adjusting member in one direction, said coöperating stop being adjustable for varying the length of the successive movements of said holder, and means for returning said traveling stop to the initial position independently of said adjusting member.

14. In a photographic apparatus, the combination of an adjustable holder for a sensitized surface, and mechanism for adjusting said holder by successive movements of predetermined length comprising an adjusting member operatively connected to said holder, separated relatively stationary stops, a traveling stop adapted to be releasably connected to said adjusting member and move therewith from one to the other of said relatively stationary stops, and means for returning said traveling stop to the initial position independently of said adjusting member.

15. In a photographic apparatus, the combination of an adjustable holder for a sensitized surface, and mechanism for adjusting said holder by successive movements of predetermined length comprising an adjusting member operatively connected to said holder, separated relatively stationary stops, a traveling stop adapted to be releasably connected to said adjusting member and move therewith from an initial position against one of said stationary stops into contact with said other stationary stop, and means for returning said traveling stop to the initial position independently of said adjusting member, one of said stationary stops being adjustable toward and from the other to regulate the length of said successive movements of said holder.

16. In a photographic apparatus, the combination of an adjustable holder for a sensitized surface, mechanism for adjusting said holder including an operating member, and stop mechanism for enabling the adjustment of said holder by successive movements of predetermined length comprising a traveling stop which is adapted to be connected to move with said operating member, coöperating stops from one to the other of which said traveling stop is movable and one of which is adjustable for varying the length of said successive movements, said traveling stop being adapted to be released and returned to the initial position independently of said operating member.

17. In a photographic apparatus, the combination of an adjustable folder for a sensitized surface, and mechanism for adjusting said holder comprising an adjusting member operatively connected to said holder, a traveling stop, means for releasably connecting said stop to said adjusting member to move therewith, a screw having a screwthreaded engagement with said stop and along which said stop is caused to travel in one direction by said adjusting member, an adjustable stop which coöperates with said traveling stop to limit the movement of said adjusting member, said traveling stop being movable on said screw independently of said adjusting member when disconnected from said adjusting member.

18. In a photographic apparatus, the combination of an adjustable holder for a sensitized surface, and mechanism for adjusting said holder comprising an adjusting shaft operatively connected to said holder, a traveling stop, a stationary screw sleeve surrounding said adjusting shaft and having a screwthreaded engagement with said traveling stop, means for releasably connecting said traveling stop to said adjusting shaft to rotate therewith whereby said traveling stop is moved in one direction along said screw sleeve, an adjustable stop on said screw sleeve which coöperates with said traveling stop to limit the rotation of said adjusting shaft, and means for rotating said traveling stop on said screw sleeve when disconnected from said adjusting shaft to return said traveling stop to the initial position.

19. The combination of a photographic projecting device, a subject holder, a holder for a sensitized surface which is adjustable parallel with the plane of said surface, and mechanism for adjusting said latter holder by successive movements of predetermined length comprising an adjusting member operatively connected to said holder, a traveling stop adapted to be releasably connected to said adjusting member to move therewith, a coöperating stop for limiting the movement of said traveling stop in one direction, and means for returning said traveling stop to the initial position independently of said adjusting member.

20. The combination of a photographic projecting device, a holder for a sensitized surface, a subject holder, a coarse adjusting mechanism for adjusting said subject holder, and a fine adjusting gearing for adjusting said subject holder located adjacent to said holder for the sensitized surface and comprising a driven member connected to said subject holder, and a driving member which is shiftable into and out of operative connection with said driven member.

21. The combination of a photographic projecting device, a holder for a sensitized surface, a subject holder, a coarse adjusting mechanism for adjusting said projecting device, and a fine adjusting gearing for adjusting said projecting device located adjacent to said holder for the sensitized surface and comprising a driven member connected to said projecting device, and a driving member which is shiftable into and out of operative connection with said driven member.

22. The combination of a photographic projecting device, a holder for a sensitized surface, a subject holder, a coarse adjusting mechanism for adjusting said subject holder comprising a toothed rack and pinion, and a fine adjusting gearing for adjusting said subject holder comprising a driven member, an endless flexible connection between said driven member and said subject holder, and a driving member which is shiftable into and out of operative connection with said driven member.

23. The combination of a photographic projecting device, a holder for a sensitized surface, a subject holder, a coarse adjusting mechanism for said projecting device comprising a toothed rack and pinion, and a fine adjusting gearing for adjusting said projecting device comprising a driven member, an endless flexible connection between said driven member and said projecting device, and a driving member which is shiftable into and out of operative connection with said driven member.

24. The combination of a photographic projecting device, a holder for sensitized surface, and a subject holder comprising a frame, holding bars slidable on said frame to engage and release the subject, rollers mounted on said holding bars and adapted to travel against said frame, and springs which act to shift said rollers about points eccentric thereto for holding said rollers in contact with said frame.

25. The combination of a photographic projecting device, a holder for a sensitized surface, and a subject holder comprising a frame, holding bars slidable on said frame to engage and release the subject, rollers mounted on said holding bars and adapted to travel against said frame, eccentric axles by which said rollers are mounted on said holding bars, and springs which tend to turn said axles for yieldingly pressing said rollers into contact with said frame.

26. The combination of a photographic projecting device, a holder for a sensitized surface, and a subject holder, a screen holder, guides on which said screen holder is arranged to slide parallel with said sensitized surface, and means for adjusting said guides toward and from the holder for the sensitized surface, said screen holder being slidable edgewise out of engagement with said guides.

Witness my hand, this 7th day of October, 1914.

WILLIAM C. HUEBNER.

Witnesses:
C. W. PARKER,
C. HORNBECK.